United States Patent
Davis et al.

(10) Patent No.: US 10,974,261 B2
(45) Date of Patent: Apr. 13, 2021

(54) SPRINKLER DEFLECTOR HEAD WITH DEVICE TO MACHINE ADJUSTMENT

(71) Applicants: Melanie Joy Davis, West Lake, TX (US); Jon Cameron, Dallas, TX (US)

(72) Inventors: Melanie Joy Davis, West Lake, TX (US); Jon Cameron, Dallas, TX (US)

(*) Notice: Subject to any disclaimer, the term of this patent is extended or adjusted under 35 U.S.C. 154(b) by 0 days.

(21) Appl. No.: 15/852,283

(22) Filed: Dec. 22, 2017

(65) Prior Publication Data

US 2019/0247871 A1    Aug. 15, 2019

(51) Int. Cl.
  *B05B 3/02* (2006.01)
  *B05B 15/652* (2018.01)
  *B05B 15/68* (2018.01)
  *B05B 1/28* (2006.01)

(52) U.S. Cl.
  CPC ............... *B05B 3/02* (2013.01); *B05B 1/28* (2013.01); *B05B 15/652* (2018.02); *B05B 15/68* (2018.02)

(58) Field of Classification Search
  CPC ......... B05B 3/02; B05B 15/652; B05B 15/68; B05B 1/28; Y02B 10/50; F05B 2220/604; F05B 2220/602; F03B 13/00
  USPC ....... 239/240, 263.1, 263.2, 241, 237, 263.3
  See application file for complete search history.

(56) References Cited

U.S. PATENT DOCUMENTS

| | | | |
|---|---|---|---|
| 4,461,423 A | 7/1984 | Davis | |
| 4,467,962 A | 8/1984 | Noble | |
| 5,211,338 A | 5/1993 | Leite et al. | |
| 7,066,404 B1 | 6/2006 | Kollar | |
| 7,216,819 B2 | 5/2007 | Bernard | |
| 7,789,321 B2 | 9/2010 | Hitt | |
| 7,844,368 B2 * | 11/2010 | Alexanian | A01G 25/16 239/69 |
| 8,302,882 B2 | 11/2012 | Nelson et al. | |
| 8,602,325 B2 * | 12/2013 | Clark | B05B 3/0422 239/222.11 |
| 8,733,672 B2 * | 5/2014 | Nations | B05B 3/02 239/240 |
| 9,415,405 B2 | 8/2016 | Shelman | |
| 2006/0122736 A1 * | 6/2006 | Alexanian | A01G 25/167 700/284 |
| 2007/0221750 A1 * | 9/2007 | Roberts | B05B 3/12 239/200 |

* cited by examiner

*Primary Examiner* — Qingzhang Zhou (57) ABSTRACT

A system and method to direct a communication from a user device to rotate a deflector guide located proximal to a sprinkler head. The sprinkler head rests on a sealed bottom ring comprised of a waterwheel, transformer, rotating slider, and D2M communications device. When water is deployed from the sprinkler head, the waterwheel inside the sealed bottom ring rotates to generate energy. This starts the communication device which maintains a D2M communication signal until the water is turned off. The communication device is managed by a user on a user device through a user interface. After communication signal is selected in the user interface of the user device, the deflector head responds to commands and pivots along a circular path. The deflector comprises an opening that limits the spray from the sprinkler head to a more limited range than if the deflector was not used.

3 Claims, 8 Drawing Sheets

SPRINKLER DEFLECTOR HEAD WITH DEVICE TO MACHINE ADJUSTMENT

BACKGROUND—FIELD OF INVENTION

The invention is related to a water sprinkler deflector system and method of adjusting the disbursement field of a sprinkler head including a mobile application for device-to-machine commands to pivot a deflector opening.

BACKGROUND OF THE INVENTION

The present invention is a useful and novel method for adjusting the direction of a deflector opening in a deflector attached proximally to a water sprinkler head in a surrounding manner. The deflector opening narrows the range the sprinkler head can disburse water.

The present deflector system is adjusted on a horizontal plane in a rotational modification achieved using a user application on user equipment, such as a mobile device. The mobile device identifies a single deflector machine based on the electronic signal emitted by the machine. The user equipment then returns electronically-coded directions to the deflector machine that achieves the rotation needed to re-position the deflector opening. The result is the besprinkling on surfaces, such as sidewalks and streets, is eliminated.

Communication between machine and user devices are traditionally achieved in number of ways. The first generation of these technologies employed a router as a base station. The user device would reach out to the router and identify a machine that the router would then locate and make available to the user device. Early examples were remote point-of-sale systems that used the local network to access a retailer's central processor. Late applications include door lock management systems where the user is able to adjust the security of a lock with a mobile application. A number of issues remain with this system architecture including severe latency (generally associated with provisioning), weak security, resource allocation, and interference management.

Within a few years, the next generation of communication between users and machines adopted the use of cellular networks (or even satellite networks) which greatly improved the mobility of the users. However, the downsides created challenges that product managers are still trying to address today. For instance, the machine is required to have a cellular communication system which is both expensive to acquire and maintain communication. It also creates bulk and demands high power consumption. The latter issue often requires the machine maintain a static position or rely on solar power. Even at the higher expense, this communication architecture is very useful in commercial applications such as remote watering systems in agriculture.

Communication Architecture

Newer communication architectures now include machine-to-machine (M2M) and device-to-device (D2D).

M2M refers to a wireless or wired network setup that allows devices of the same type and ability to communicate freely. M2M addresses communication between machines that are not necessarily connected to the Internet, or do not rely on the Internet to affect that communication. M2M communication is an enabler, and often time describe as a subset, of the Internet-of-Things (IoT). The indeterminate definition of IoT generally refers to the network of physical objects that feature an IP address for internet connectivity, and the communication that occurs between these objects, Internet-enabled devices, and other systems.

While technology terms evolve over time, M2M currently refers to technologies that enable communication between machines without human intervention. The typical M2M application example of this type of scheme is vehicle-to-vehicle communication where information is shared between neighboring vehicles and relayed for analysis to a central processor through a secured cloud. M2M communication is an important aspect of military theatre management, agriculture management, remote control, robotics, warehouse management, telemedicine, telemetry, traffic control, logistics, supply chain management and fleet management.

The architecture for M2M consists of a variety of network solutions, both licensed and unlicensed, adapted to the spectrum of M2M applications and solutions. Each network solution is trying a unique approach to solve a standard engineering problem: how to trade off cost, complexity, and performance.

Cellular is the only type of M2M network that uses its own licensed frequency space. Cellular has dominated the M2M space since its inception. The primary benefit of cellular is the ubiquitous coverage and the mobility of the user. The major disadvantages of cellular are short battery life, high-cost end points, and high recurring fees. It is nearly impossible to use cellular unless there is a non-battery power supply to the machine.

Due to low cost and lower power chipsets, Wi-Fi has become the most prevalent emerging M2M communication architecture over the last few years. Wi-Fi's downfalls include coverage, latency, and provisioning.

Another option is Bluetooth Low Energy (BLE), which is also called Bluetooth Smart or Bluetooth 4.0. BLE is a wireless personal area network technology. BLE uses considerably less power than first-generation Bluetooth. BLE enables short-burst wireless connections and uses multiple network topologies, including point-to-point (P2P) topology for one-to-one (1:1) device communications. BLE P2P optimizes data transfers and is ideal for connected device products, such as fitness trackers and health monitors. The downside is users are limited by range and packet sizes. BLE is designed to transmit only small bits of information online through a phone or computer. Bluetooth joins a host of emerging technologies that address unique engineering solutions including, but not limited to, Symphony Link, SIGFOX, LoRaWAN, 6LoWPAN, LTE Cat 0/1, NB-IoT, Weightless, WirelessHART, Z-Wave and Zigbee.

The second communication type mentioned above is device-to-device (D2D). D2D connectivity is a relatively new paradigm in cellular networks that allows user devices in close proximity to communicate directly without the use of a core network or base station (BS). DSD makes operators more flexible by allowing the offloading of traffic from the core network, decreases latency, reduces cost and reduces energy requirements. Unlike M2M, human intervention is prominent, a large amount of data can be transferred, and communication is cellular to cellular. Short-range wireless technologies like Bluetooth, Wi-Fi Direct and LTE Direct can be used to enable D2D communication. They differ mostly in the device discovery mechanisms, data rates, distance between devices, and types of engineering applications. Wi-Fi Direct allows up to a maximum data rate of 250 Mbps in a 200-meter range. LTE Direct provides data rates up to 13.5 Mbps and a range of 500 meters. Bluetooth 5 supports a maximum data rate of 50 Mbps within a range of 230 meters.

D2D communication can efficiently support local data services through anycast, unicast, groupcast and broadcast transmissions. Unicast is a communication between a single sender and a single receiver over a network. The term is contrasted with multicast, a communication between a single sender and multiple receivers; and anycast, a communication between any sender and the nearest of a group of receivers in a network.

Common usage scenarios for D2D includes:
1. Data offloading;
2. Share processing power;
3. Data sharing;
4. Disaster-area communication;
5. Voice communication in areas without a BS, or has a disabled BS;
6. Coverage extension by using the user mobile devices as relays;
7. Machine-to-cloud communication in M2M architecture.

In terms of spectrum types, D2D communication is classified into inband and outband.

Inband allows the cellular communication and the D2D communication to use the same spectrum licensed to a cellular operator.

For outband, the D2D communication uses unlicensed spectrum outside any licensed spectrum, but may include communication specific to other electronic devices such as Bluetooth. In addition, there are proximity-based services (ProSe) standards that allow physically close devices to discover each other and then communicate via direct links. It is also known as LTE Direct because it allows direct communications between user devices used in a licensed spectrum in the global LTE ecosystem.

Any of these communication types allow a connection from a transmitter user device to its intended receiver user device in a single hop.

Ongoing challenges include peer discovery, security, mobility, interference, resource allocation, mode selection, synchronization, mode selection, and monetization.

One of the largest hurdles in both M2M and D2D is peer discovery. Peer discovery is the ability for one device/machine to notice and then uniquely identify another device/machine. A device must be able to quickly identify nearby device but with lower power consumption. There are two types of peer discovery techniques, open and restricted. Open discovery can be discovered simply by the D2D/M2M devices being in close proximity to each other. Restricted discovery allows communication only between clients that are authorized to respond to each other.

Security is general stronger in both M2M and D2D communication networks since the data is not accessed with a central location. However, these networks are susceptible to common attacks such as denial of service, IP spoofing, malware attacks, eavesdropping.

Most D2D work has been focused on the static position of the user devices although the cellular networks themselves are designed for moving user devices. Additional work is needed to manage interference and handover policies as the devices move across cells.

For inband communications, D2D shares a spectrum with cellular which may produce interference because of how they share the spectrum. In outbound, the interference is between the D2D/M2M end-points. One method to reduce interference is to reduce the transmit power levels. Therefore, the goal in interference management is to create algorithms and rules to efficiently manage transmit power controls. Interference minimization, resource allocation, mode selection and are closely related objectives and are often jointly optimized.

Resource allocation is an algorithm and policies that allow sharing of the spectrum with D2D resources. Allocation is a critical step in creating and then maintaining direct links between the user devices in the cellular network.

Mode selection is the algorithms and policies that enable choosing between D2D or cellular communication for communication between the user devices. Once the user devices have discovered each other, and become candidates for D2D communication, the network evaluates network performance, such as channel gain, signal strength or noise, and then determines if cellular or D2D is preferred for the communication. This is based on performance objectives such as lower latency, lower power usage, or high spectral efficiency. Mode selection can be executed by either the user device or the network.

Synchronization helps a user device to use the right frequency and time slot for discovery by its intended peer and then communicating with that node. With a cellular network, user devices manage time and frequency synchronization using periodic broadcasts from the BS. If they are using the same BS, the user devices can synchronize within the same broadcast. Complications arise in a D2D communication when the user devices either don't share the same BS or are positioned outside a BS.

Considering D2D communications use a cellular network, monetization of the D2D communication between the users becomes an essential business challenge. This results in a complex set of potential incentives and chargeable services including allowing the user devices to sell bandwidth.

Waterwheel

Waterwheels produce electrical current through the forcible rotation of a wheel by the flow of water. The resulting electrical current is stored in a battery or conveyed to a utility through power lines. A waterwheel may be a component of larger systems such as hydropower plants but also be a simplified device comprising the components of:
1. Water, either flowing or falling;
2. Axle, for the wheel to be mounted on and to transmit the power to the transformer;
3. Wheel;
4. Blades or buckets arranged around the wheel or axle;
5. Transformer, to collect power from the axle and transform to direct current (DC) or alternating current (AC);
6. Power collection or relay device, such as a battery or utility line, to efficiently collect the power generated by the transformer.

The types of waterwheels include stream (water strikes the bottom of wheel in flowing water), vertical axis (blades mounted to the side with axle to floor and ceiling), breastshot (water strikes the wheel between one forth and one half of the wheel height), undershot (water strikes below the bottom quarter of the wheel height), backshot (water strikes at the top of the wheel and before the axle), overshot (water strikes at the top of the wheel and in front of the axle), and turbine (swirling motion).

Sprinkler Water Deflector

Shelman, Tony in U.S. Pat. No. 9,415,405 discloses system for preventing a sprinkler from spraying water in an undesirable direction and includes a deflector cap having a top surface, and a skirt extending from the top surface, the skirt having a cap opening configured to align with a nozzle orifice in a sprinkler nozzle, and a fastener configured to attach the deflector cap to the sprinkler nozzle. For attachment, a fastener may be a snap-on ring positioned on an inner surface of the top surface of the deflector cap, a hook system, and/or an adhesive. As such, the initial placement of the deflector is either permanent or difficult to adjust. It cannot be adjusted for changing wind conditions.

All the sprinkler deflectors heretofore known suffer from a number of disadvantages:
1. Adjustments are difficult or impossible to be made after initial installation;
2. Installation is manually done while standing next to, or over, an active sprinkler head resulting in wetting of the installer;
3. Sprinkler head can require readjustment after landscape maintenance as the deflector is knocked out of placement;
4. There is no system to establish or maintain a previous position setting.

SUMMARY OF THE INVENTION

An invention, which meets the needs stated above, is a system and method to direct a communication from a user device to rotate a deflector guide located proximal, and surrounding, to a sprinkler head. The sprinkler head rests on a sealed bottom ring comprised of a waterwheel, transformer, rotating top slider, and D2M communications device. When water is deployed from the sprinkler head, the waterwheel inside the sealed bottom ring rotates to generate energy. This starts the communication device which maintains a communication signal until the water is turned off. After the communication signal is selected in the user interface of the user device, the deflector head responds to commands and pivots along a circular path with the sprinkler riser as the axis. The deflector comprises an opening that limits the spray from the sprinkler head to a more limited range than if the deflector was not used. The user can adjust the spray pattern of the sprinkler head without manually adjusting the deflector guard and therefore the user is able to remain dry during the process.

Objects and Advantages

Accordingly, besides the objects and advantages of the system for using machine-to-device communication to adjust a sprinkler deflector head described above, several objects and advantages of the present invention are:
a) to provide a solution to make on-the-fly adjustments to the sprinkler disbursement field;
b) to provide an automated solution to eliminate besprinkling during shifting winds;
c) to provide landscape providers a unified way to reset paths to eliminate besprinkling cause by maintenance;
d) to provide a single solution and interface to manage overspray across sprinkler system manufacturers;
e) to improve latency with a single hop system;
f) to allow manufacturers to adjust overspray without having access to a client's Wi-Fi or cellular network.
g) to provide post-installation add-on solutions.

Further objects and advantages of this invention will become apparent from a consideration of the drawings and the ensuing description of the drawings.

DRAWING FIGURES

The accompanying drawings, which are incorporated in and constitute a part of this specification, illustrate embodiments of the present invention and together with the description, serve to explain the principles of this invention. In the figures.

KEY TERMS anycast: a communication between any sender and the nearest of a group of receivers in a network. Compare multicast, unicast.

base station (BS): a relay located at the center of any of the cells of a cellular telephone system; or a short-range transceiver that connects a machine, computer, or other wireless device to a central hub and allows connection to a network.

BS: see base station (BS)

chipset: a group of integrated circuits (microchips) that can be used together to serve a single function and serve as a communications controller between a machine and device.

D2D: see device-to-device (D2D)

device-to-device (D2D): a communication system that allows user devices in close proximity to communicate directly without the use of a core network or base station (BS).

D2M: see device-to-machine (D2M)

device-to-machine (D2M): a communication system comprising a wireless user device, such as a mobile phone, that communicates with a machine containing an electronic address/identification but no wired power and no battery power supply. See Internet protocol (IP), identification.

hop: a round trip communication between two devices. A single hop would be direct communication from a device to another device/machine. A multi-hop may employ a router or base station.

identification, identity: the unique name of a person, device/machine, or the combination of both that is recognized by a system. See Internet protocol (IP).

Internet protocol (IP): the method, or protocol, by which data is sent from one computer to another on the Internet. Each computer, device, or machine on the Internet has at least one IP address that uniquely identifies it from all other computers on the Internet.

IP: See Internet protocol (IP)

latency: for our purposes, the network delay between when an instruction is transferred and data is transferred back to the instructing device, and thus completing a round trip. Latency definitions can vary across systems and networks.

M2M: see machine-to-machine (M2M)

machine: any physical object with electrical, mechanical, or sensor properties.

machine-to-machine (M2M): a communication system comprising a wireless or wired network communication between machines that allows assemblies of the same type and ability to communicate freely.

multicast: communication between a single sender and multiple receivers. Compare anycast, unicast.

provisioning: the processes of establishing a node-to-node communication based on a unique user identification.

spectrum: type of licensed or unlicensed radio frequencies allocated to the mobile industry and other sectors for communication over the airwaves.

unicast: a communication between a single sender and a single receiver over a network. Compare multicast and anycast.

REFERENCE NUMERALS IN DRAWINGS 10 smart deflector, deflector, machine
15 sprinkler system
20 directional guard
30 guard vent
40 brackets for top ring
50 top ring
52 top ring magnet
60 bottom ring, machine
61 rotating slider with engine
62 magnet or metal plate
63 visible serial number
64 chipset with electronic identification number and communication
65 power input
66 battery (DC)
67 riser locking mechanism
68 visible alignment guide (for initial installation)
69 electronic address, IP
70 waterwheel
71 axle
72 blades
73 transformer
74 water
75 battery storage
76 accessories
77 accessories with a communication chipset
80 sprinkler head, nozzle
90 riser
100 ground
110 landscape
200 user device, user equipment, wireless device
201 power
210 hardware
212 display
214 memory, storage, RAM, ROM
216 processor
218 device chipset
220 user interface, device application
230 rotation control
240 setup controls
242 database
250 chipset selection controls
260 weather application
270 mapping application
290 user
300 cellular network
310 base station
320 wireless communication
330 wired or wireless communication
340 sprinkler controller
400 Wi-Fi network
410 router
420 wireless communications
500 D2M network
510 wireless communication

DETAILED DESCRIPTION OF THE DRAWINGS

Figure 1A:
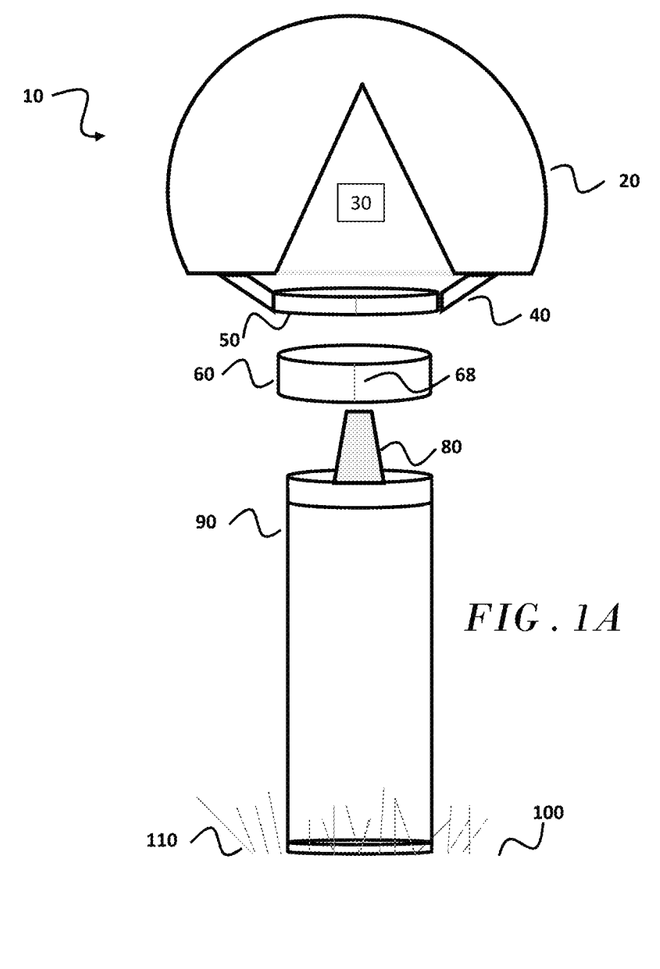
FIGS. 1A-1C.—Illustrations representing a smart deflector assembly.
Figure 1B:
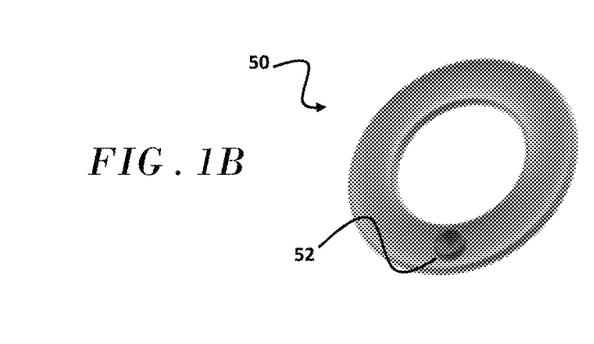
Figure 1C:
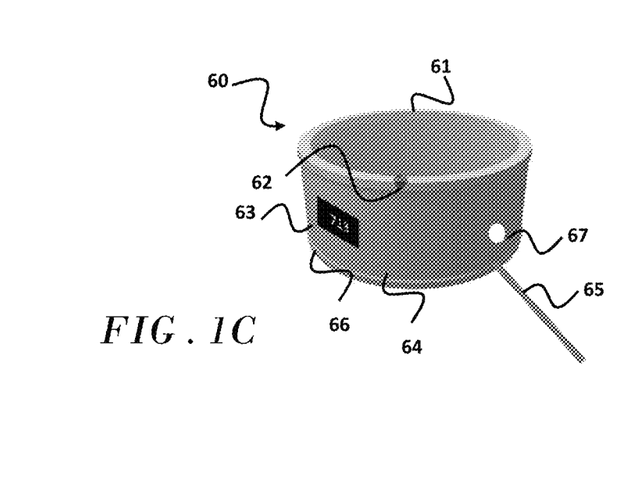

Referring to the drawings, in which like numerals represent like elements,

FIGS. 1A-1C

Turning to the first FIGS. 1A-1C, the illustrations depict a smart deflector 10 assembly. The assembled present invention 10 combines a directional guard 20 RESTING on a lower support structure 50, 60 comprising a sprinkler system 15 mounted into the ground 100.

The irrigation sprinkler system 15 is supported by a structure buried into the ground 100 and attaching to the riser 90. The underground structure is largely comprised of tubing used for the transportation of water 74 to the riser 90 and sprinkler head 80. The water 74 is moved through underground tubing either by pumping or internal water pressure from the plumbing system. The modern systems 15 often operate on a schedule which is modified by existing weather conditions. Organized into zones, a system 15 turns on the water 74 by magnetizing a solenoid with electrical current. The solenoid, which sits on top of an outlet-side valve, lifts a stainless-steel plunger up and into the center of the solenoid. By doing this, the raised plunger allows air to escape from the top of a rubber diaphragm positioned in the center of the valve. Water 74 that has been charged and waiting on the inlet side of the diaphragm lifts the diaphragm. This pressurized water 74 rushes past the diaphragm and is then allowed to escape downstream of the outlet valve. The outlet valve is connected to a series of pipes located underground 100. Thus, each zone has a separate electrical attachment to a sprinkler system's 15 control box 340. The electricity for each zone may be split and used for the power input 65 for other machines 60 or sensors.

Weather conditions may be collected by sensors attached to the sprinkler systems 15 control box 340. These local sensors detect conditions like temperature and humidity (i.e., freezing and rain). Weather conditions may also be collected by online weather reporting applications 260. The applications 260 are more predictive than local sensors because they can inform the system of future rainfall, the total predicted amount of rainfall, and freezing temperatures.

Above ground 100, the system includes a riser 90, which may comprise a pop-up riser 90, and a sprinkler head 80. Sprinkler head 80 types vary depending on water pressure, gallons flow per minute and the type of landscape 110. Fixed heads 80 produce a tight, constant fan of water 74 and are primarily used for small lawns and ground cover. Gear driven heads 80 feature adjustable patterns and are suitable for mid to large size lawns. A multi-stream head 80 produces a series of thin streams of water 74 that rotate and are suitable for uneven surfaces and medium size yards. Unlike a multi-stream, rotary heads 80 deliver a single stream that pivots in a circle and thus applies the water 74 more slowly to the landscape 110. Shrub heads 80 are mounted above foliage on long risers 90 and usually have a special nozzle pattern.

In FIG. 1B, showing the bottom surface of a top ring 50 with an attachment means comprising magnets, male-female connections, threaded connectors, pins, adhesives, or hooks and loops. In the present example the attachment is a magnet 52. In FIG. 1A, a support structure rest on the top side of the top ring 50 to help to support and stabilize a direction guard 20. The top side of the top ring 50 is attached to brackets 40 and the brackets are connected to the surface of the directional guard 20. In one embodiment, the bracket 40 is attached to the under surface of the directional guard 20. In another embodiment the bracket 40 is assembled to the outer surface of the directional guard 20. The bracket 40 and top ring 50 level and stabilize the directional guard 20.

The directional guard 20 is a cavity with a fully enclosed back, fully enclosed top, and a guard vent 30. The shape of the cavity may be substantially a hollowed concave interior surface. In another embodiment, the fully enclosed top may be flat with a perpendicular fully enclosed back. In another embodiment, the enclosed surfaces may be shaped into a conical top. The directional guard 20 is sized to surround and house a sprinkler head 80.

A guard vent 30 is manufactured to provide an opening in the directional guard 20 for a portion of the water's 74 spray to exit the directional guard. The guard vent 30 is initially installed by centering on the exit hole of the sprinkler head 80 so that the visible alignment guide 68 is position centered on the outlet whole of the sprinkler head 80. The size of the guard vent 30 may be manufactured to provide a pre-determine coverage degree or may be presented as removable sections to allow the installer to customize the width of the spray. After the final assembly with the bottom ring 60, the installer can remotely adjust the direction the guard vent 30 faces thus moving it off center from the exit hole of the sprinkler head 80.

In FIG. 1C, showing a bottom ring 60, the ring comprising a visible serial number 63 of the one or more communication chips 64 identification number 69, one or more communications chipset 64, power input 65, battery 66, one or more riser locking mechanism 67, one or more visible alignment guide 68 for initial installation, a rotating mechanical slider 61 with one or more attachment means 62 comprising magnets, male-female connections, threaded connectors, pins, adhesives, or hooks and loops. The attachment means 62 on the top of the bottom ring 60 will be designed to lock with the attachment means 52 of the top ring 50.

The bottom ring 60 is attached to the riser 90 using a rising locking mechanism 67 so the bottom ring 60 is fixedly interconnected to the riser 90. The rotating slider 61 is positioned on the top of the bottom ring 60 and rotates independently of the position of the top ring 50. When the top ring 50 and bottom ring 60 are attached, the rotating mechanical slider 61 may be controlled by the user equipment 200 to rotate the location of the guard vent 30 in relationship to the exit hole of the sprinkler head 80. The present non-limiting example uses a magnet or metal plate 62 on the rotating slider 61 to lock to the magnet 52 on the top ring 50. The user equipment 200 wirelessly connects to the bottom ring's 60 communications chipset 64. The instructions generated on the user equipment 200 are received and translated by the chipset 64 causing the rotating slider 61 to pivot either right or left in relationship to the fixed-positioned bottom ring 60. The chipset 64 and rotating slider 61 are powered by a battery 66. In another embodiment, chipset 64 and rotating slider 61 are powered by an alternating current (AC) power input 65. The AC power 65 may be obtained by splitting the current running from the sprinkler control panel 340 for the associated zone.

Figure 2A:
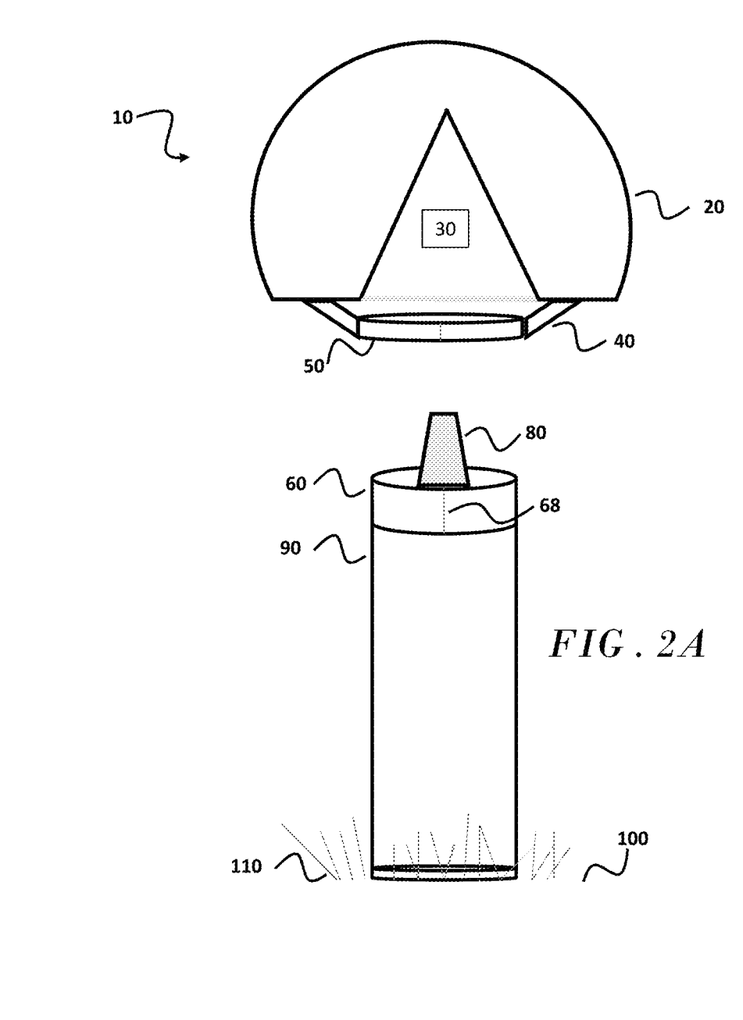
FIGS. 2A-2C.—Illustrations representing a smart deflector assembly with a waterwheel.
Figure 2B:
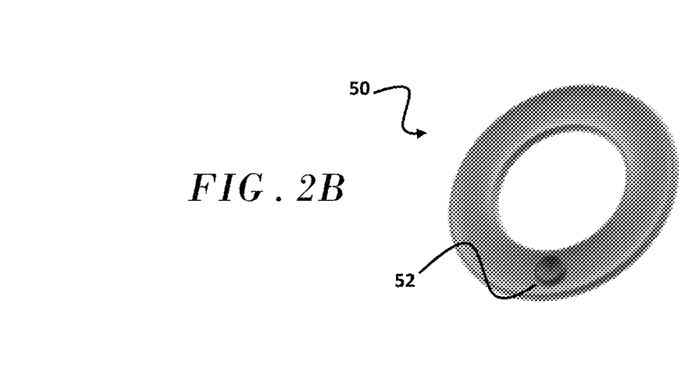
Figure 2C:
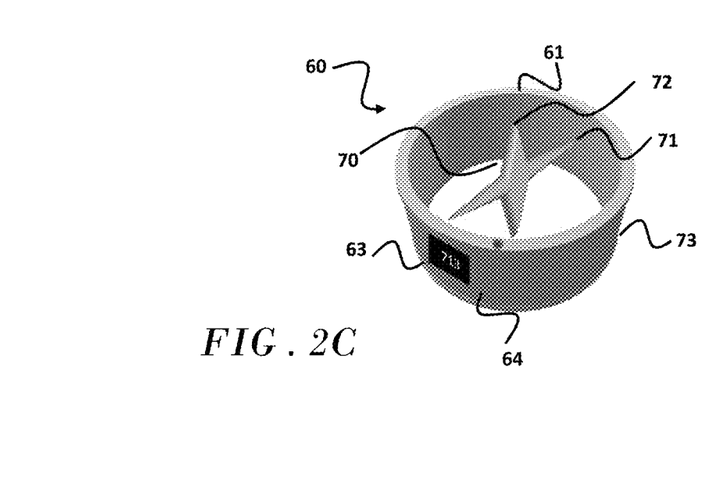

FIGS. 2A-2C

Referring now to FIGS. 2A-2C, the drawings shows a smart deflector 10 assembly with a waterwheel 70. These figures are substantially the same as FIGS. 1A-1C in the structure and assembly of the directional guard 20 (FIG. 2A), top ring 50 (FIG. 2B), and sprinkler system 15 (FIG. 2A). The new embodiments of the FIGS. 2A-2C are the construction (FIG. 2c) and assembly of the bottom ring 60 (FIG. 1A). The bottom ring now is a machine 60 containing an electronic address 69, such as an IP, but does not contain an alkaline battery 66 power source or AC power 65. In FIG. 2C, the bottom ring 60 contains similar features as FIG. 1C comprising a rotating slider with an engine 61, one or more mechanisms 62 for attaching to the top ring 50, a label with a visible serial number (or a portion of that number) 63, one or more communications chipsets 64, and a visible alignment guide 68 to align the top ring 50 with the bottom ring 60. Absent in FIG. 2C is the power input 65, battery 66 and riser locking mechanism 67. The need for these are replaced by a waterwheel 70 comprising an axle 71 with one or more blades 72 with the axle 71 attached to one or more transformers 73.

In FIG. 2A, the bottom ring 60 comprises a waterwheel 70 housed over the riser 90, and assembled to the riser 90 of the sprinkler system 15. The installation objective is to engage the waterwheel 70 by the water 74 before the water 74 exits the sprinkler nozzle 80. The riser 90 is attached to the sprinkler head 80 using a threaded spiral shape on the inside of the riser 90 and the outside the sprinkler head 80. Therefore, the bottom ring 60 would be couple to the riser 90 using a spiral threaded shape on the bottom of the bottom ring 60. The bottom ring 60 would be coupled to the sprinkler head 80 using a spiral threaded shape on the top of the bottom ring 60. In another embodiment, the assembly may be made by heating a polyethylene hose and/or use of clamps. The fitting of the bottom ring 60 may be inserted in the flexible tubing normally reserved for the riser's 90 fitting. The installation objective is to engage the waterwheel 70 by the water 74 before the water 74 exits the sprinkler nozzle 80. In FIG. 2A., the bottom ring 60 is assembled to the top of the riser 90 and the bottom of the sprinkler nozzle 80. In another embodiment, the bottom ring 60 and the sprinkler nozzle 80 may be a single unit so the installation would be a standard installation of the riser 90 attached to the flexible tubing and the combined member 60,80 installed to the riser 90. Another embodiment would combine the bottom ring 60, with the waterwheel 70, the sprinkler nozzle 80, and the deflector 10 into a single unit 60,70,80,10. Another embodiment would have the waterwheel 70 manufactured inside the riser 90 with an electrical connection to the bottom ring 60.

When water 74 is pushed through the riser 90 and into the bottom ring 60, it spins the blades 72 around the axle 71 of the waterwheel 70 attached to the bottom ring 60 by the axle 71. The axle 71 is connected to a transformer 73 housed inside the bottom ring 60. The spinning motion of the waterwheel 70 sends motion through the axle 71 and to the transformer 73. The transformer 73 transforms the motion into energy. Also located in the bottom ring 60, and electronically attached to the transformer 73, is a chipset 64 with an electronic identification number 69 and wireless communication 510 capabilities, such as Wi-Fi. The transformer 73 is also electronically attached, directly or indirectly, to the rotating slider 61 to allow the slider 61 to pivot left or right in relationship to the fixed bottom ring 60. The transformer 73 may be used to charge a battery 66, including an external battery 66, for use in other devices, lights or machines.

Therefore, the flow of water 74 through the bottom ring 60 provides power 201 to the chipset 64 which then produces and an electronic signal and transmits the electronic identification 69. Unless, a battery is included to collect any residual energy, the transmission would end when the waterflow is ended by the sprinkler controller 340 and valve.

The user 290 can start the user device 200 and open the user interface 220. The protocol 69 matching the machine's 60 transmission is transmitted from the user's hardware 210 in a return communication and thus completing the hop and establishing a two-way communication between the device 200 and the machine 60. The mobile or computing device 200 may then send a pairing code to the machine 60 and in turn receive a pairing confirmation from the bottom ring 60 to complete the pairing process. The user 290 can then use the device application 220 to select the chipset 64 associated with the desired smart deflector 10 and using the controls 230 on the application to adjust the relationship of the guard vent 30 to the sprinkler nozzle 80.

Figure 3A:
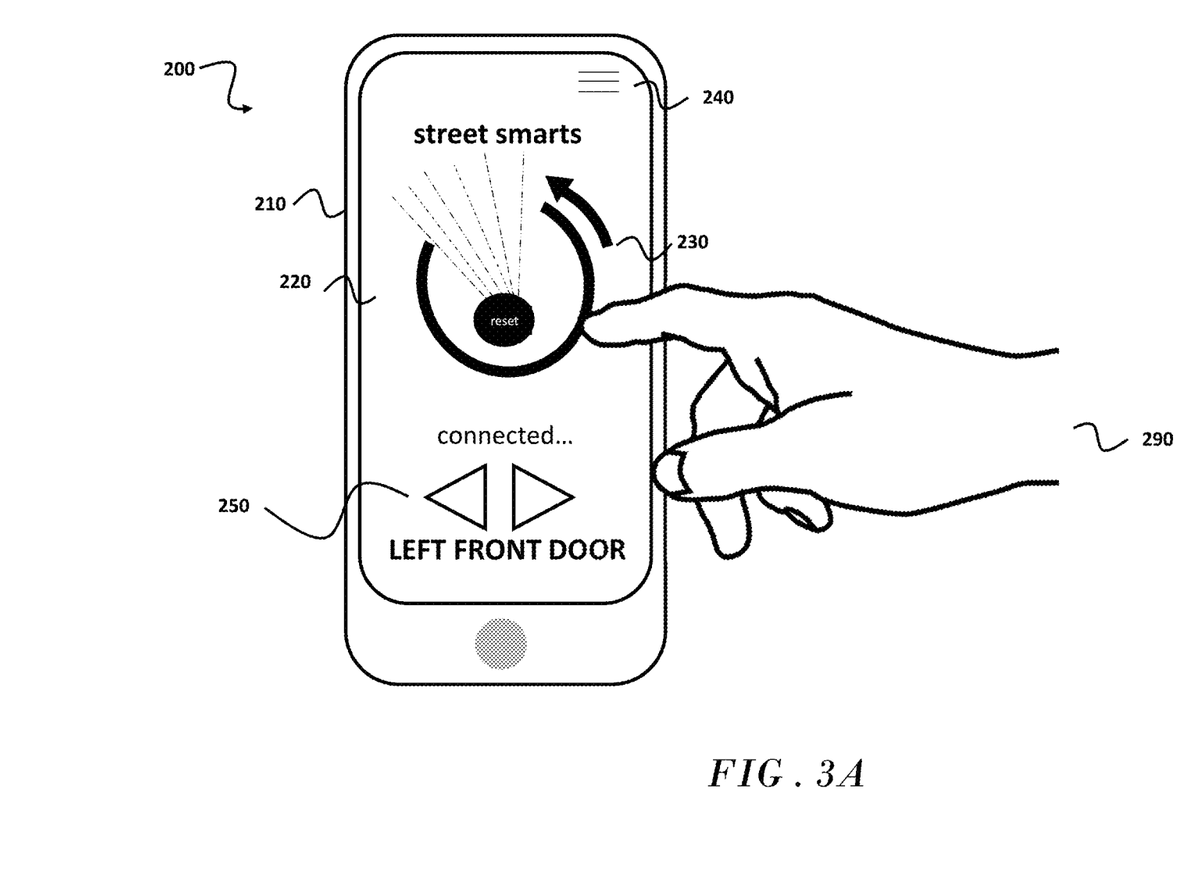
FIG. 3.—Drawing of an example user interface on a user device to manage a water sprinkler deflector.
Figure 3B:
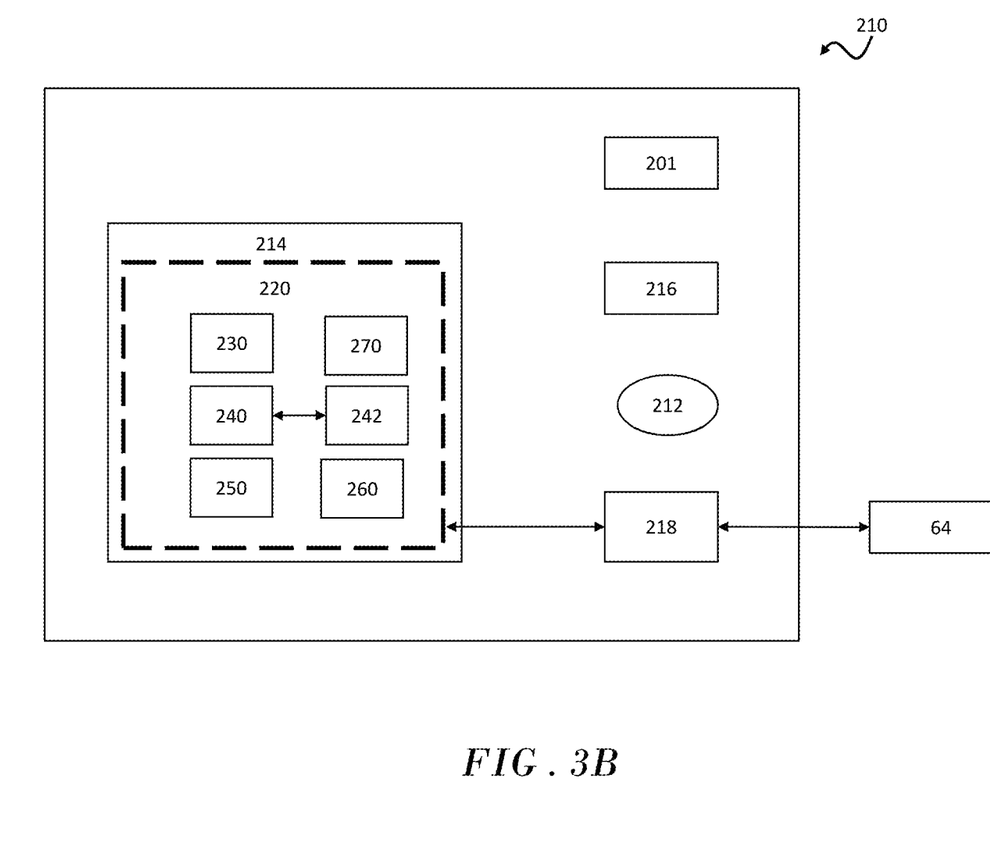

FIGS. 3A-3B

Finally, turning to FIGS. 3A-3B, demonstrating the use of the invention when a personal user device 200 is utilized to control the water deflector 10 of an individual sprinkler head 80.

First turning to FIG. 3A showing a non-limiting example interface 220 on the user device 200 for utilization by the user 290 to manage the functions of the smart deflector 10. The setup controls 240 comprises functions to allow the adding smart deflectors 10, delete deflectors 10, name the deflectors 10 and manage mapping applications 270. In a non-limiting example application, the user 290 would select setup controls 240 to add a deflector 10. To match the deflector, the user 290 observes the visible serial number 63 on the smart deflector which may comprise the full identification 69 number or an abbreviation of the last few numbers of the ID 64. In a machine-to-device configuration, the user 290 would first turn on the water 74 flow to the sprinkler systems 15. The flow of the water 74 across the waterwheel 70 initiates a chipset 64 communication from the bottom ring 60. The deflector's 10 identification number 69 would then show on the setup screen 240 of the user interface 220. In this non-limiting example, the user 290 decides to add a description of the location as 'Left Front Door' using the display's 212 keyboard function. The device application 220 would store the association of the identification number 69 and the description on the user device's 200 database 242. Exiting the setup screen 240, the user 290 now shows 'connected' to one or more deflectors 10. If more than one, the user interface 220 shows the chipset selection controls 250 to allow the user 290 to select the specific deflector 10 they wish to adjust directional facing the guard vent 30.

In this non-limiting example, the user 290 selects 'Left Front Door' using the chipset selection controls 250. The device's 200 chipset 218 connects to the machine's 60 chipset 64 and establishes an open two-communication. The mobile or computing device 200 may then send a pairing code to the machine 60 and in turn receive a pairing confirmation from the bottom ring 60 to complete the pairing process. The user 290 can now engage the rotation controls 230 on the user interface 220. In the present non-limiting example, the interface 220 shows a simple graphic as if looking down on the sprinkler head 80. The user 290 rotates left and right on the graphic to limit the deflector's 10 path to avoid besprinkling. In the present example, if the user 290 wants to adjust the deflector 10 to a previous setting, the user 290 presses 'reset.' Once adjusted, the user 290 can close the application 220 or chose a new deflector 10 with the chipset selection controls 250.

Alternating wind will affect the path of water 74 from a sprinkler head 80, even with an attached smart deflector 10. The application 220 may also use a weather application 260, as either a component of the user interface 220, or as a feed from a separate application, to monitor the speed and direction of the atmospheric wind. Wind direction is reported from the direction from which it originates. Rules would be set by the weather application on how to automatically, and temporarily, adjust the direction of the guard vent 30. Non-limiting example rules may be:

1. no response would be executed for any wind speeds under 7 miles per hour;
2. no adjustment would be made outside the scheduled water times;
3. the calculated degree of temporary rotation based on the direction and speed of the wind.

As an non-limiting example, if a map 270 of the smart deflectors 10 is stored on the database 242 in the storage 214, and that map 270 shows the user 290 originally set the direction of the guard vent 30 as facing northeast, and the weather application 260 shows a wind with a southeast origination at 15 miles per hour, the device application 220 can automatically adjust the guard vent 30 to a more eastern facing to compensate for the wind speed and direction.

In FIG. 3B, the hardware 210 of the user device 200 comprises a display 212 for input and output, memory and/or storage (such as ROM and/or RAM) 214, processor 216, a power source 201, communications chipset 218 and a module for the sprinkler device application 220. The power 201 comprises alternating current (AC) and variable direct current (DC) electronically linked together. The display 212 serves the function of rendering the application 220 on the hardware 210 and receiving commands comprising keyboard, chipset selection 250, setup 240, and smart deflector 10 rotation control 230. The processor 216 runs the application 220 in memory 214 comprising commands such as rotation control 230, setup 240 and smart deflector chipset selection 250. The processor 216 also manages the device's 200 communication chipset's 218 communication with the machine's chipset 64. The processor 216 would manage any weather applications 260 contained on the device 200 or as a module of the device application 220. A database 242 located on the storage 214 stores the setup 240 information, including any mapping 270 data. The database 242 would record the written description and the association with the machine's chipset 64 identification.

A device 200 comprises any system with a computer processor 216 including mobile computers, personal computers, personal digital assistants, smart phones, laptops, tablets, wearable computers, ultra-mobile personal computers, enterprise digital assistants, electronic book readers, minicomputers, mainframes, servers, workstations, minicomputers, microcomputers, desktop computer, clones, terminals, and the like.

Figure 4:
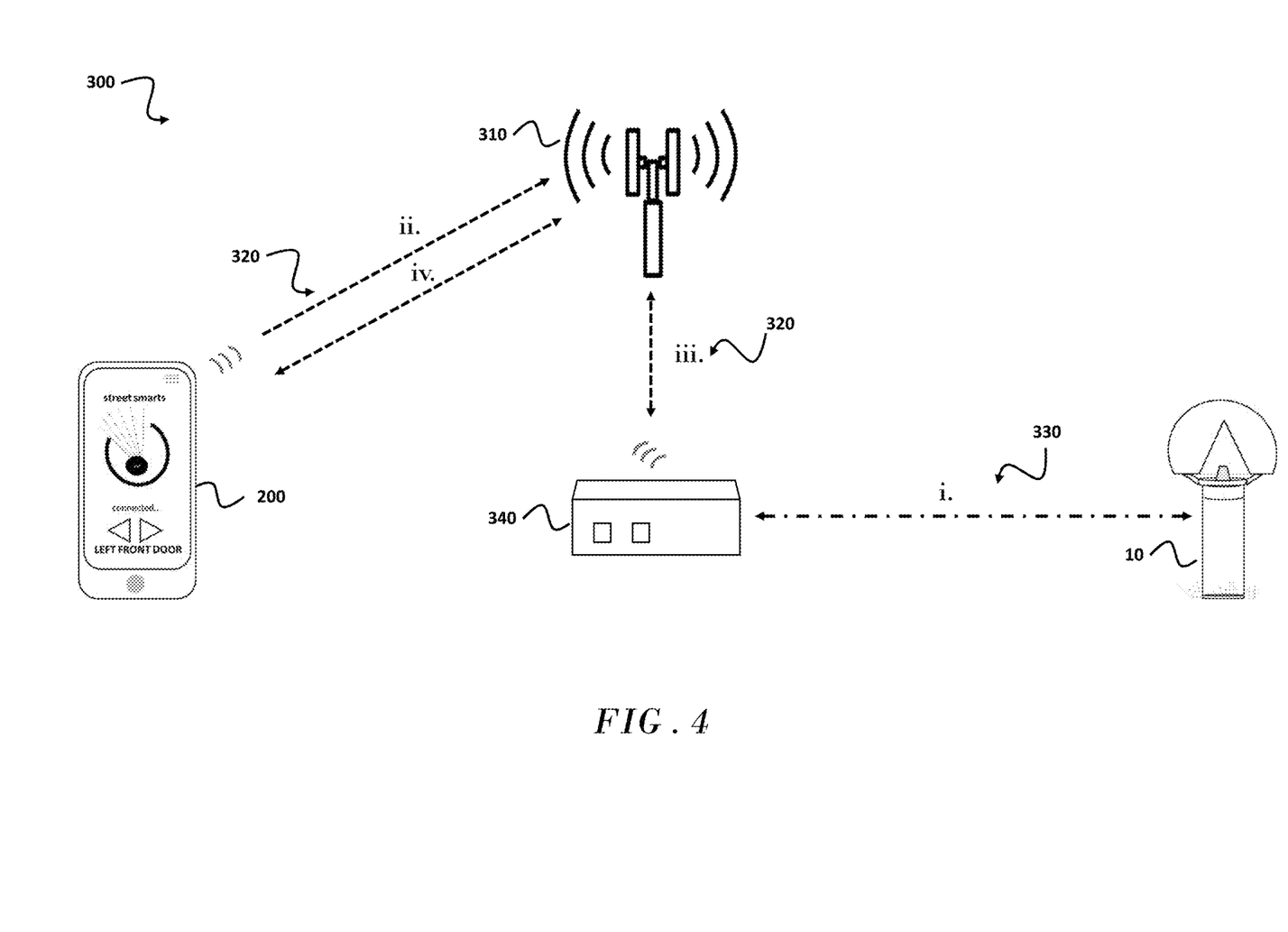
FIG. 4.—Diagram showing the data movement on a cellular network between the user device and a water sprinkler.

FIG. 4

FIG. 4 is a diagram illustrating the data movement on a cellular network 300 between the user device 200 and a smart deflector 10. The non-limiting example figure shows the communication begins (step i.) with either a wired or wireless communication 330 between the smart deflector 10 and a sprinkler controller 340. The controller 340 may be the same unit used to turn on sprinklers, schedule sprinkler times, and monitor weather conditions. In another embodiment, the controller 340 may be dedicated to the control of the smart deflector 10.

Another embodiment would have a cellular chipset 64 on the machine 10 and the machine 10 would communicate directly with the base station 310.

The user 290 would engage the machine 60 by launching the user interface 220 on the user device's 200 hardware 210. The user interface 220 may establish a wireless communication 320 (step ii.) with the base station 310 on the licensed spectrum. In establishing the communication, the user device 200 may send a pairing code to the base station 310 which is relayed to the controller 340. The base station 310 relays the call from the device application 220 and dials the sprinkler controller 340 (step iii.) to establish the first two-way open communication. The base station 310 then establishes a two-way open communication (step iv.) with the device application 220 and links together the open communication (steps iii. and iv.) between the controller 340 and the user device 200. In response to the pairing code, the controller 340 relays a pairing confirmation to the base station 340 to complete the pairing process. Once the user 290 selects an identification 69 with the chipset selection controls 250, in this non-limiting example identified as 'Left Front Door,' the controller 340 contacts the smart deflector 10 located to the left of the front door by engaging the chipset 64 housed in the bottom ring 60. The user 290 is then able to rotate the guard vent 30 using the rotation controls 230 in the user interface 220. The interface 220 sends commands to the chipset 64. The chipset 64 is electronically connected to the rotating slider with an engine 61 located on the top surface of the bottom ring 60. With the bottom surface of the top ring 50 attached to the top surface of the bottom ring 60, the guard vent 30 rotates at the direction of the device application 220. In another embodiment, the top ring 50 and bottom ring 60 are permanently bonded together during manufacturing, or prior to assembly to the riser 90. In even another embodiment the features of the top ring 50 and bottom ring 60 are combined as a single ring attached to the riser 90 and the directional guard 20.

Once the user 290 closes the device application 220, the user device 200 ends the communication 330 with the machine 10 (steps ii., iii., iv.). The machine 10 continues to maintain communication (step i.) with the sprinkler controller 340 or base station 310.

Figure 5:
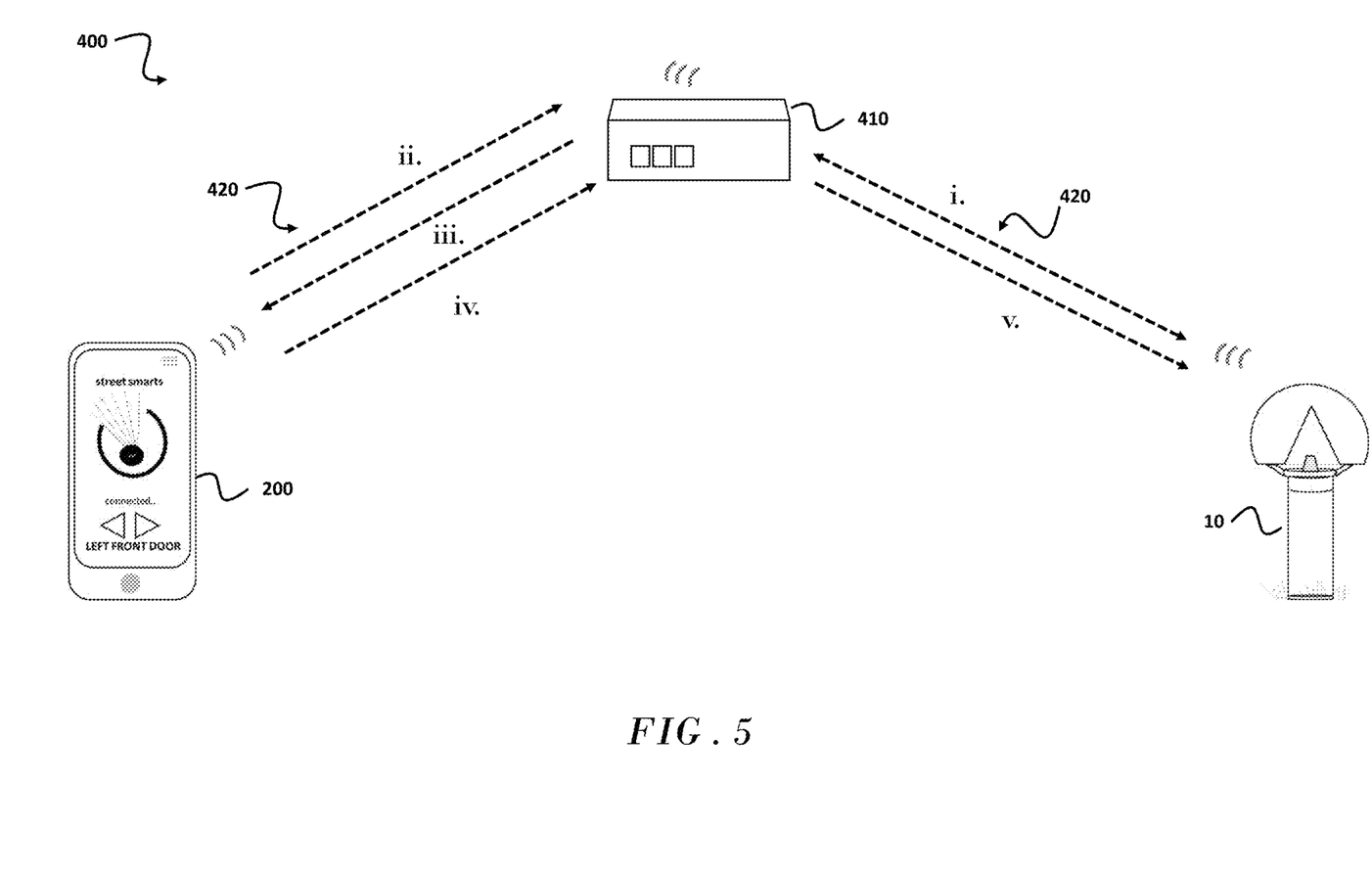
FIG. 5.—Diagram exemplifying the data movement on a Wi-Fi network between the user device and a water sprinkler.

FIG. 5

FIG. 5 is a diagram illustrating the data movement on a Wi-Fi network 400 between the user device 200 and a smart deflector 10.

The router 410, which may or may not be connected to the Internet, maintains a connection with the machine 10 (step i.). In another embodiment, the router 410 maintains its principal connection (step i.) with a sprinkler controller 340. The controller 340 may share the functions and equipment of a primary sprinkler controller 340. In another embodiment, the controller 340 may be dedicated to the control of the smart deflector 10.

The user 290 would then initiate a wireless connection 420 (step ii.) with the router 410 by launching the user interface 220 on their hardware 210. The router 410 responds to the device's 200 initial connection (step ii.) by sending a small packet (step iii.) to the application 220 to show the user 290 is now connected and can begin sending commands to the machine 10. The mobile or computing device 200 may send a pairing code to the machine 60 and in turn receive a pairing confirmation from the bottom ring 60 to complete the pairing process. In this non-limiting example, the application 220 shows the message 'connected.' Another embodiment may have the screen change colors and or flash.

The user 290 then selects the chipset 64 associated with the smart deflector 10 the user wishes to adjust. This can be shown as a map in one embodiment. In another embodiment, the chipset's 64 identification 69, such as an Internet protocol, can be assigned a description. In the present example, the chipset 64 in the bottom ring 60 has been assigned the description 'Left Front Door' during the setup 240. The selection of the chipset 64 with the application's 220 chipset selection controls 250 sends wireless 420 commands (step iv.) to the router 410 that is then relayed by the router 410 to the chipset 64 encoded in the command's packets (step v.). The router 410 establishes an open wireless connection 420 between the device 200 and the chipset 64 in the smart deflector 10. The user 290 can send additional commands, such as rotation control 230 or setup controls 240 in the open wireless communication 420 (steps iv. and v.) to the smart deflector 10. Once the user 290 closes the user interface 220, the wireless connection 420 to the router 410 is disconnected but the router 410 maintains a connection to the smart deflector 10, or sprinkler controller 340 (step i.).

Figure 6:
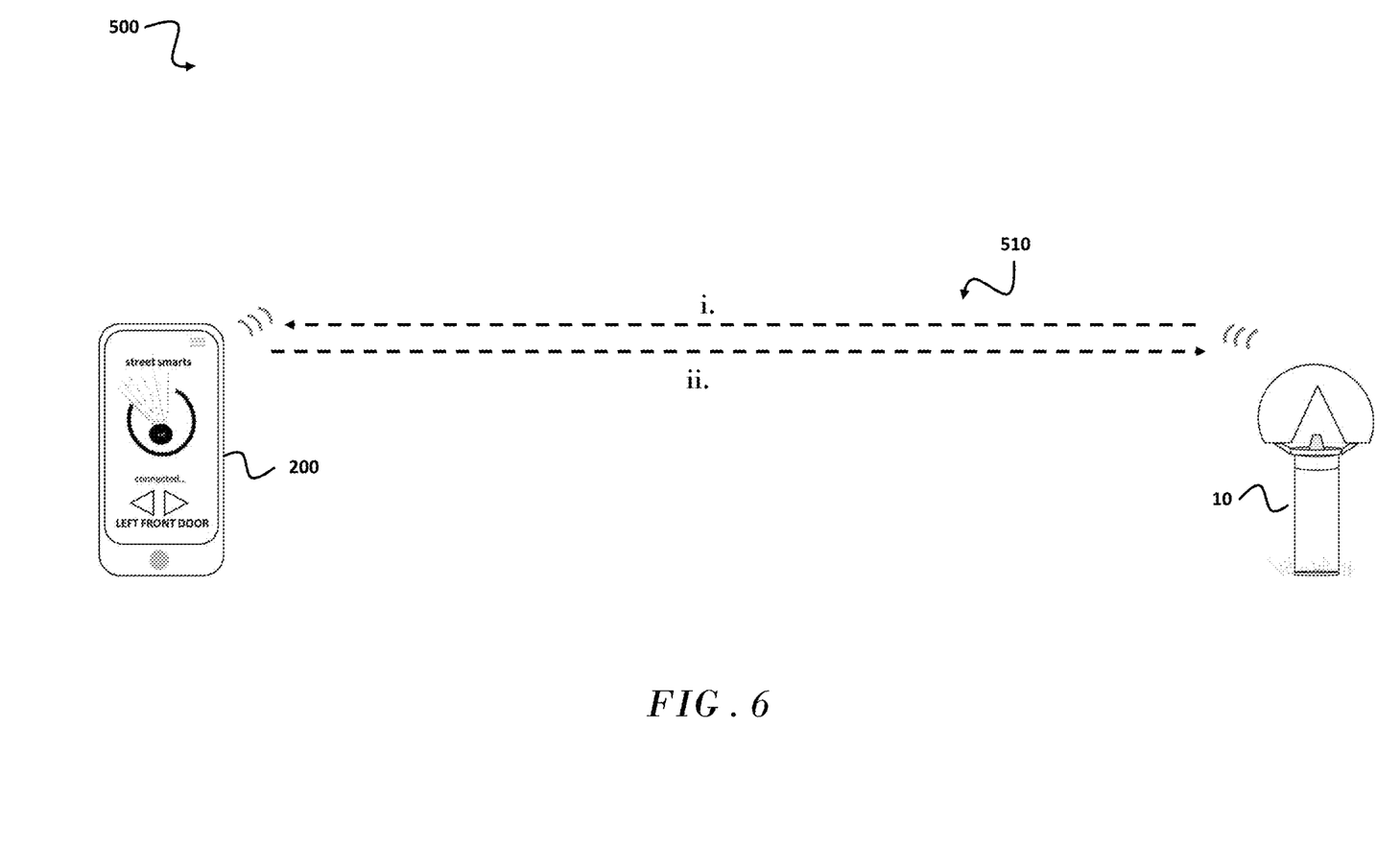
FIG. 6.—Diagram exemplifying the data movement on a D2M network between the user device and a water sprinkler.

FIG. 6

FIG. 6 is a diagram illustrating the data movement on a device-to-machine (D2M) network 500 between the wireless device 200 and a smart water sprinkler deflector 10. A D2M communication network comprises a wireless user device 200 and machine 60 where the machine contains an electronic address 69, such as an Internet protocol, but no alternative current (AC) 65 power input or direct current (DC) power 66 input. A machine 10 can be any physical object with mechanical, electrical or sensor properties. In the present embodiment shown, the machine is the bottom ring 60 of the deflector 10 and therefore the deflector 10 comprises a machine. The bottom ring 60 comprises a waterwheel 70 housed over, and assembled to the riser 90 of the sprinkler system 15. When the water 74 is pushed through the riser 90 and into the bottom ring 60, it spins the blades 72 around the axle 71 of the waterwheel 70 attached to the bottom ring 60 by the axle 71. The axle 71 is connected to a transformer 73 housed inside the bottom ring 60. The spinning motion of the waterwheel 70 sends motion to the transformer 73 which converts the motion into energy. Additionally located in the bottom ring 60, and electronically attached to the transformer 73, is a chipset 64 with electronic identification number 69 and wireless communication capabilities 510, such as Bluetooth.

Therefore, the flow of water 74 through the waterwheel 70 provides power 201 to the chipset 64 which then produces an electronic signal 510 (step i.) and transmits the electronic identification 69.

The D2M communication represents a single hop between a wireless device 200 and at least one machine 60. The hop can be configured as an anycast or unicast communication. The user 290 may then engage with the wireless device 200 and start the user interface 220. The protocol matching the machine's 10 transmission is transmitted 510 from the user's hardware 210 in a return communication (step ii.) and thus completing the hop and establishing a two-way communication between the device 200 and the machine 10. The mobile or computing device 200 may then send a pairing code to the machine 60 and in turn receive a pairing confirmation from the bottom ring 60. This completes the pairing process. The user 290 can then use the device application 220 to select the chipset 64 associated with the desired smart deflector 10. In the present example, the user 290 selects the smart deflector 10 located on the left side of the front door. Utilizing the open connection between the device 200 and the smart deflector 10, and using the rotation controls 230, the user 290 can adjust the rotation of the directional guard 20 to eliminate overspray. To rotate the location of the guard vent 30, the rotating slider with an engine 61 electronically attached to the transformer 73, pivots left or right on a horizontal plane, based on the electronic commands wirelessly transmitted 510 (step ii.) by the device application 220. With the top ring 50 assembled to the bottom ring 60, the directional guard 20 rotates to allow the guard vent 30 to control besprinkling.

Once the user 290 turns off the device application 220, or the device 200, the communication (step ii.) from the device 200 to the machine 60 is terminated to produce a remaining half hop. The machine's chipset 64 continues to transmit (step i.) its identification number if the flow of water 74 continues. The single hop has the advantages of low latency period and a low-power communication. Using the waterwheel 70 additionally reduces the need for AC to DC power connections 65.

Figure 7:
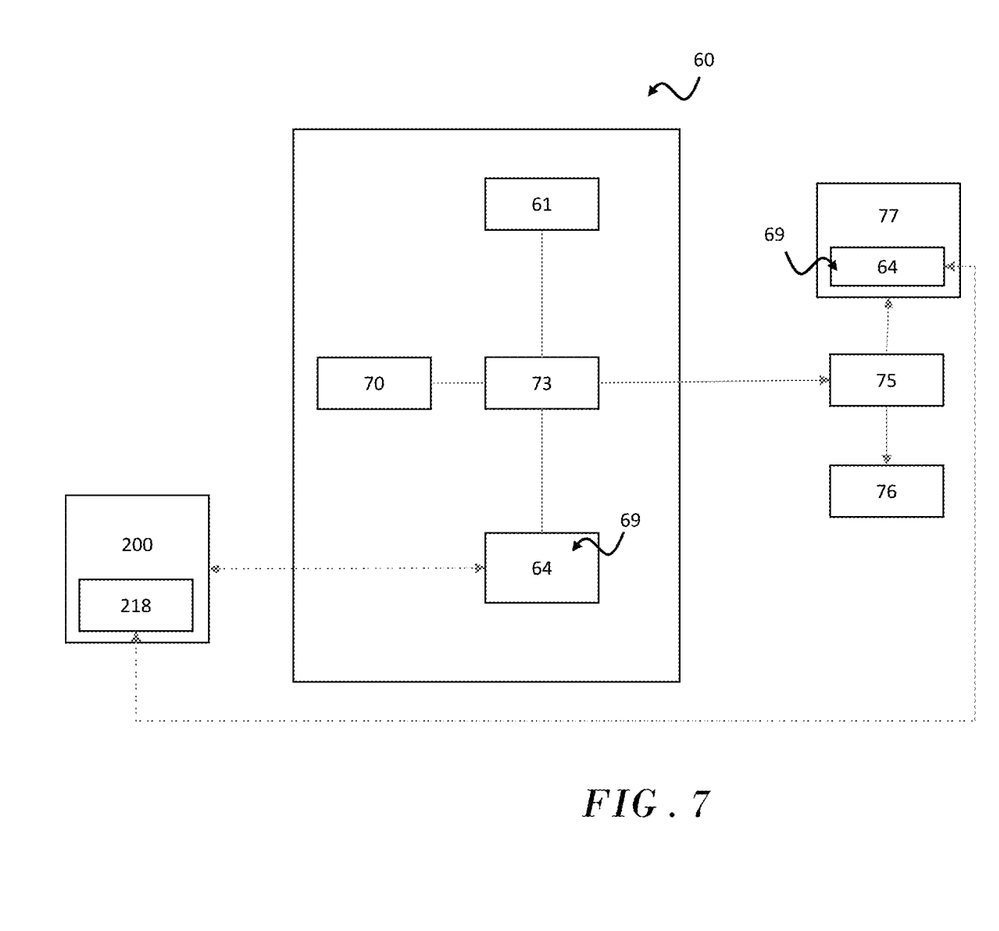
FIG. 7.—Drawing of an example machine generating energy from a water when and dispersing that energy to a rotating slider, chipset, external battery, and accessories.

FIG. 7

Finally, turning to FIG. 7, a drawing of an example machine 60 that provides self-generated power and communications 320 for other machines 60 and accessories 76, 77. The bottom ring 60 contains one or more waterwheels 70 coupled to a transformer 73 so that the transformer 73 can convert the machine energy into an electrical energy. The transformer 73 then supplies that electrical energy to power the communications chipset 64 with an electronic address 69 and a rotating slider with an engine 61. When water 74 moves past the waterwheel 70, the transformer 73 powers on the chipset 64. The chipset 64 then begins communicating by broadcasting an electronic address 69. The broadcast 320 of the electronic address 69 will be relatively continuous as long as water 74 moves through the waterwheel 70. When a user 290 wishes to engage with the bottom ring to adjust the vent, the user powers up the user device 200 and turns on the user application 220. The application 220 will then engage the device chipset 218 to seek and identify the broadcast 320 from at least one machine 60. After the device 200 and machine 60 complete a pairing protocol, the user 290 can issue commands 230, via the application 220, to a machine 60. In the present nonlimiting example, the device 200 may provide instructions 230 to rotate the facing of the guard vent 30 into a new direction to adjust besprinkling. Once the user 290 finishes adjusting the vent 30, they may close the application 220 which results in the device's 200 chipset 218 ceasing communication with the machine's 60 chipset 64. The machine's 60 chipset 64 will continue to broadcast the electronic address 69 until the water 74 is turned off.

The result is the waterwheel 70 continues to produce electrical energy that goes mostly unused. In FIG. 7, the energy from the transformer 73 can also be stored in a battery storage 75. The battery storage 75 system may comprise an inverter, charge controller, and meter. The battery storage 75 may be part of a battery bank that stores energy from other sources such as solar arrays. The energy stored in one or more battery storage 75 can the be used to power other accessories 76 such as lighting, sensors, and remotely located electrical outlets.

The stored energy from the transformer 73 may also be used to power other machines 77 with a chipset. The user 290 would then be able use the same application 220, or a different application, to engage with the secondary machine 77 powered by the battery storage 75. This would be particularly useful for machines 77 requiring electrical current but are remotely located from an AC power source. A nonlimiting example would be the installation of a wireless locking mechanism on a yard gate 77. Through the user device, the associated application would use the devices 200 chipset 218 to contact the secondary machine's 77 chipset 64 identified by the electronic address 69. The electronic address 69 may be associated with an alphanumeric description stored in the memory 214 database 242 on the user device 200. The device 200 may call the machine 77 electronic address 64 and turn on the machine 77. In another embodiment, the machine 77 may broadcast a relatively continuous IP address 64. In the present example, the application 220 could lock, unlock, open, or close the yard gate using the continuous supply of electricity stored in the battery storage 75 and provided by the waterwheel 70. In another embodiment, the machine 77 would directly draw power from the transformer 73 associated with the machine 60 that provides self-generated power.

Although the present disclosure and its advantages have been described in detail, various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

In the foregoing description, and the following claims, method steps and/or actions are described in a particular order for the purposes of illustration. It should be appreciated that in alternate embodiments, the method steps and/or actions may be performed in a different order than that described. Additionally, the methods described above may be embodied in machine-executable instructions stored on one or more machine-readable mediums, such as disk drives, thumb drives or CD-ROMs. The instructions may be used to cause the machine (e.g., computer processor) programmed with the instructions to perform the method. Alternatively, the methods may be performed by a combination of hardware and software. While illustrative and presently preferred embodiments of the invention have been described in detail herein, it is to be understood that the inventive concepts may be otherwise variously embodied and employed, and that the appended claims are intended to be construed to include such variations, except as limited by the prior art.

Benefits, other advantages, and solutions to problems have been described herein with regard to specific embodiments. However, the advantages, associated benefits, specific solutions to problems, and any element(s) that may cause any benefit, advantage, or solution to occur or become more pronounced are not to be construed as critical, required, or essential features or elements of any or all the claims of the invention. As used herein, the terms "comprises", "comprising", or any other variation thereof, are intended to cover a non-exclusive inclusion, such that a process, method, article, or apparatus composed of a list of elements that may include other elements not expressly listed or inherent to such process, method, article, or apparatus.

ADVANTAGES

From the description above, a number of advantages become evident for the "Sprinkler Deflector Head with Device-to-Machine Adjustment". The present invention provides all new benefits for participating parties including end-users, sprinkler manufacturers, and landscape managers:

a) allows manufacturers to provide add-on components to consumers to improve the spray pattern of their sprinkler systems;
b) allows end-users to control besprinkling without getting wet;
c) allows end-users to instantly reset the deflectors to their original settings if the deflectors have been knocked out of position;
d) allows the system to automatically adjust the water disbursement field based on wind conditions;
e) allows landscape managers to install aftermarket solutions to improve the function of the sprinkler installation;
f) allows residual energy generated by the machine to be stored and used for the power of at least one machine, lights, or sensors;
g) allows landscape managers to seasonally adjust the spray pattern of the sprinkler system;
h) allows adjustment of the machines without the use of an AC or DC power source;
i) allows a device to machine communication without a router or cellular connection between the devices;
j) allows a machine to broadcast an electronic address without having an AC or DC power source.

What is claimed is:

1. A directional guard apparatus in a sprinkler system for adjusting a spray pattern of a fixed water sprinkler head, the apparatus comprising:
   a. a top ring assembled to a rotational directional guard;
   b. a fixed-position bottom ring assembled between the fixed water sprinkler head and a riser;
   c. the fixed-position bottom ring comprising a rotational waterwheel with an axle;
   d. the axle of the rotational waterwheel is mounted to a transformer;
   e. the transformer coupled to a rotating slider with an engine;
   f. the transformer coupled to a communication chipset in communication with a mobile phone;
   g. the rotational guard rotating only during communication between the communication chipset and the mobile phone;

whereby, water flowing through the fixed-position bottom ring will power the communication chipset of the fixed-position bottom ring deflector to pivot the rotational directional guard during communication with the mobile phone without pivoting the fixed water sprinkler head.

2. A rotational directional guard apparatus in a sprinkler system for managing a spray pattern of a fixed water sprinkler head, the apparatus comprising:
   a. the rotational directional guard assembled to the top ring;
   b. the rotational directional guard comprising a guard vent;
   c. a fixed-position bottom ring comprising a rotational waterwheel with an axle;
   d. the fixed-position bottom ring housed over and assembled to a riser;
   e. the fixed water sprinkler head assembled to the riser;
   f. a rotating slider with an engine attached comprising a metal plate positioned on the top of the fixed-position bottom ring;
   g. the fixed-position bottom ring assembled to the top ring utilizing one or more brackets and the metal plate of the top ring;
   h. the axle of the rotational waterwheel is pivotably mounted to a transformer and a communication chipset;
   i. the transformer coupled to the rotating slider with the engine;
   j. the transformer coupled to the communication chipset in communication with a mobile phone;
   k. the rotational guard rotating only during communication between the communication chipset and the mobile phone;

whereby, water flowing through the fixed-position bottom ring will power the communication chipset of the fixed-position bottom ring deflector to pivot the rotational directional guard during communication with the mobile phone without pivoting the fixed water sprinkler head.

3. The pivoting directional guard apparatus in claim 2, wherein the metal plate is a magnet.

* * * * *